(No Model.) 2 Sheets—Sheet 1.

G. H. GARD & G. C. SHOOLRIDGE.
CHECK ROW PLANTER.

No. 457,113. Patented Aug. 4, 1891.

Witnesses.
A. Ruppert,
H. A. Daniels

Inventors.
George H. Gard
Godfrey C. Shoolridge
Per
Thomas P. Simpson
Atty (No Model.) 2 Sheets—Sheet 2.

G. H. GARD & G. C. SHOOLRIDGE.
CHECK ROW PLANTER.

No. 457,113. Patented Aug. 4, 1891.

Witnesses.
H. Ruppert
H. A. Daniels

Inventors.
George H. Gard
Godfrey C. Shoolridge
Per
Thomas P. Simpson
atty

UNITED STATES PATENT OFFICE.

GEORGE H. GARD AND GODFREY C. SHOOLRIDGE, OF ELKHART, ILLINOIS.

CHECK-ROW PLANTER.

SPECIFICATION forming part of Letters Patent No. 457,113, dated August 4, 1891.

Application filed November 19, 1890. Serial No. 371,906. (No model.)

*To all whom it may concern:*

Be it known that we, GEORGE H. GARD and GODFREY C. SHOOLRIDGE, citizens of the United States, residing at Elkhart, in the county of Logan and State of Illinois, have invented certain new and useful Improvements in Check-Rower Mechanism; and we do hereby declare the following to be a full, clear, and exact description of the invention, such as will enable others skilled in the art to which it appertains to make and use the same.

The special object of the invention is to make a check-rower which will drop the seed and mark the places therefor without the use of a wire or any equivalent thereof.

The invention will first be described in connection with the drawings, and then pointed out in the claims.

Figure 1:
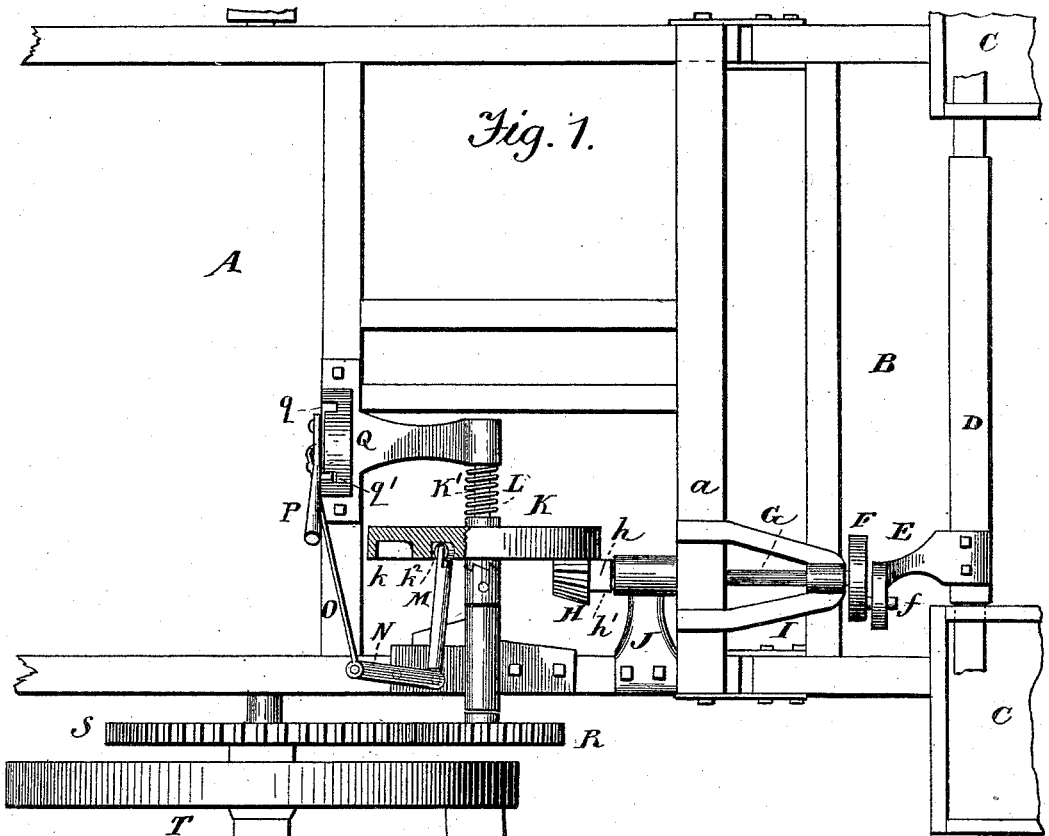
Figure 2:
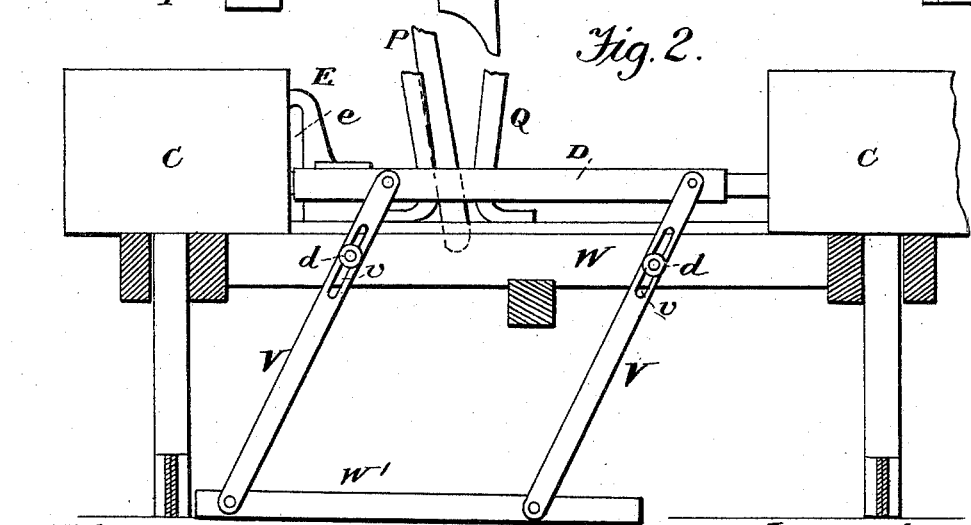
Figure 3:
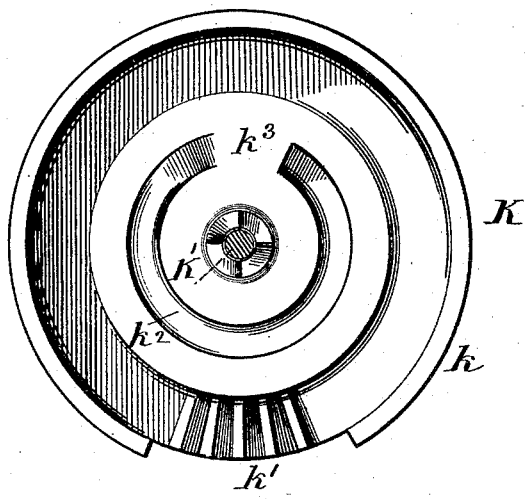
Figure 4:
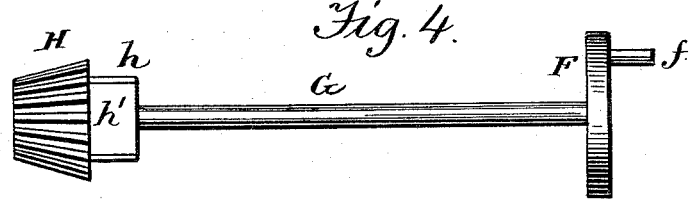
Figure 5:
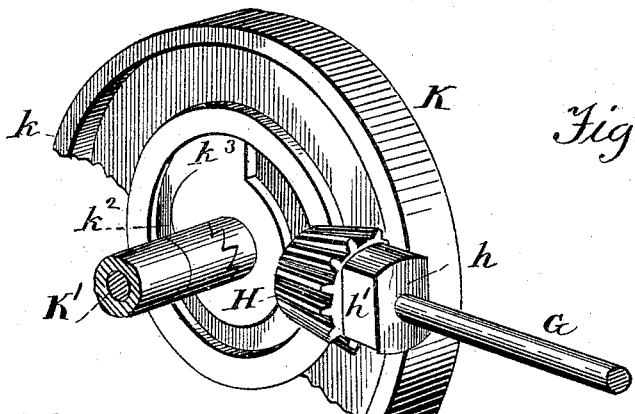

Figure 1 of the drawings is a plan view of a planter with our attachment. Fig. 2 is a transverse vertical section; Fig. 3, a detail view of the band-wheel; Fig. 4, a detail view of pinion and shaft, the latter provided with side-flattened boss; Fig. 5, a detail perspective view to show how the band-wheel works in connection with the boss of the pinion-shaft.

In the drawings, A represents the wheeled frame carrying our attachment, and B the runner-frame, which precedes and carries the seed-hoppers C C.

D is the dropper-slide, on which is fastened a casting E with the vertical slot $e$. In this slot plays the wrist-pin $f$ on the rotary disk F, whose shaft G passes through the guide-bearings I J, as well as through the cross-beam $a$ of the frame A.

H is a pinion on one end of the shaft G, with a side boss $h$, having two opposite flat sides $h'$ $h'$.

K is a disk having on the inner side and edge of its periphery a circumferential band $k$, which extends around the disk except for a short distance where are arranged the teeth $k'$ on the inside. As the disk K revolves the band $k$ presses against the flat side $h'$ of the boss of the pinion H so as to prevent said pinion from being revolved until it is time to move the dropper-slide. When the open space between the ends of the band $k$ is reached, the teeth $k'$ rotate the pinion so as to move the dropper-slide and drop the seed from both hoppers. When the end of the rows is reached, the loose disk K, clutched to the fixed shaft-clutch, is pushed back against the spiral spring L by means of the rod M so as to cause a cessation of the seed-dropping until a new start is taken in two new rows. The rod M works in a groove $k$ on the disk, said groove being circular and having its ends connected by the ridge $k^2$. The pusher M therefore does not bear upon the disk so as to ungear the clutches until it passes up on the ridge $k^2$ and just before the diametrical opposite teeth $k'$ engage with the pinion H. Hence after the planter is turned round at the end of row and started on the return rows the seed-slides begin to drop as soon as the clutches are brought together.

Q is a rack in which the lever P may be held by one notch $q$ to keep the disk out of gear with the pinion H or in another notch $q'$ to retain it in gear.

M N O P is the pusher mechanism.

The disk-shaft K' carries a fast pinion R, which is rotated by a spur-wheel S, which is attached to the hub of one of the ground-wheels T.

W is the cross-beam of frame under the seed-hoppers C C, and V V straps or straight metallic bars attached to the dropper-slide D at the top by means of the bolts $d$ $d$, which work in the slots $v$ $v$. The lower ends of the bars are pivoted to the marker W'. At each movement of the dropper-slide D the marker W' will be forced down to the ground so as to mark the rows at right angles to the hill where the corn is to be dropped. Thus it will be seen that the dropping mechanism will be operated from the ground-wheel and so connected with the check-marker that the two must work synchronously. This enables the farmer to check his hills with great exactness and uniformity so that the cultivators may work both ways between the rows of corn without cutting it up.

What we claim as new, and desire to protect by Letters Patent, is—

1. In check-rower mechanism for operating the dropper-slide of a corn-planter, the pinion H, having a boss $h$, made flat on the two opposite vertical sides, in combination with a rotary disk K, having the band $k$ on one side of its periphery and the teeth $k'$ between the ends of said band, as and for the purpose described.

2. In check-rower mechanism, the combination, with the pusher mechanism M N O P, of the disk K, having the circular groove $k^2$, with ends separated by a ridge $k^3$, nearly but not quite opposite to the teeth $k'$ between the ends of band $k$, as and for the purpose set forth.

In testimony whereof we affix our signatures in presence of two witnesses.

GEORGE H. GARD.
GODFREY C. SHOOLRIDGE.

Witnesses:
J. L. BRADY,
F. C. NEWBURY.